Jan. 9, 1934.  F. W. GREIMANN  1,943,219
CORN COVERER
Original Filed Feb. 3, 1932   2 Sheets-Sheet 2
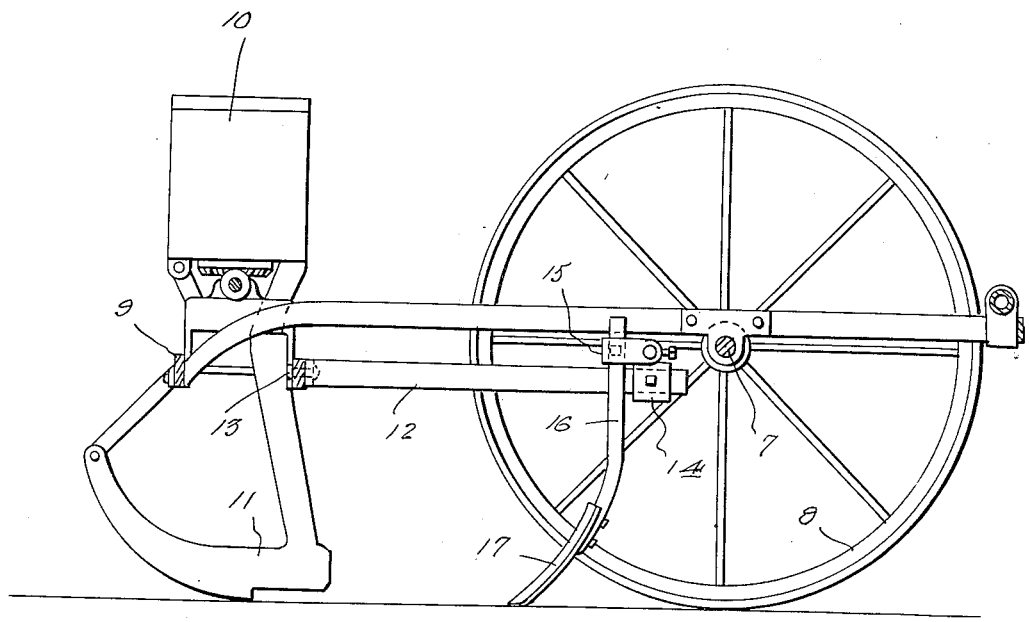
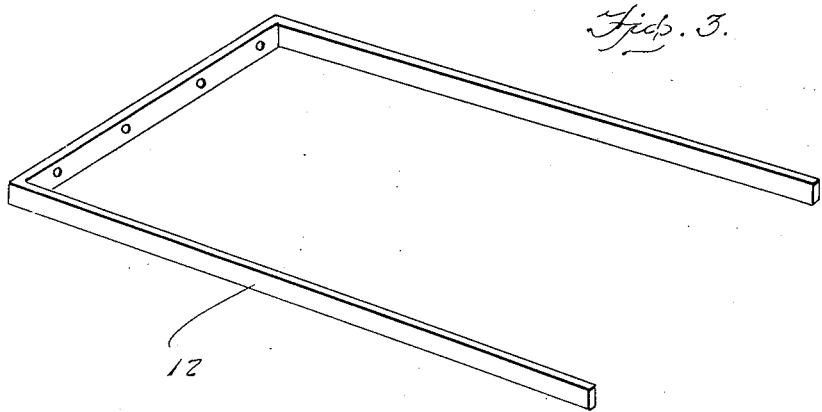
Inventor
F. W. Greimann
By Clarence A. O'Brien
Attorney Patented Jan. 9, 1934

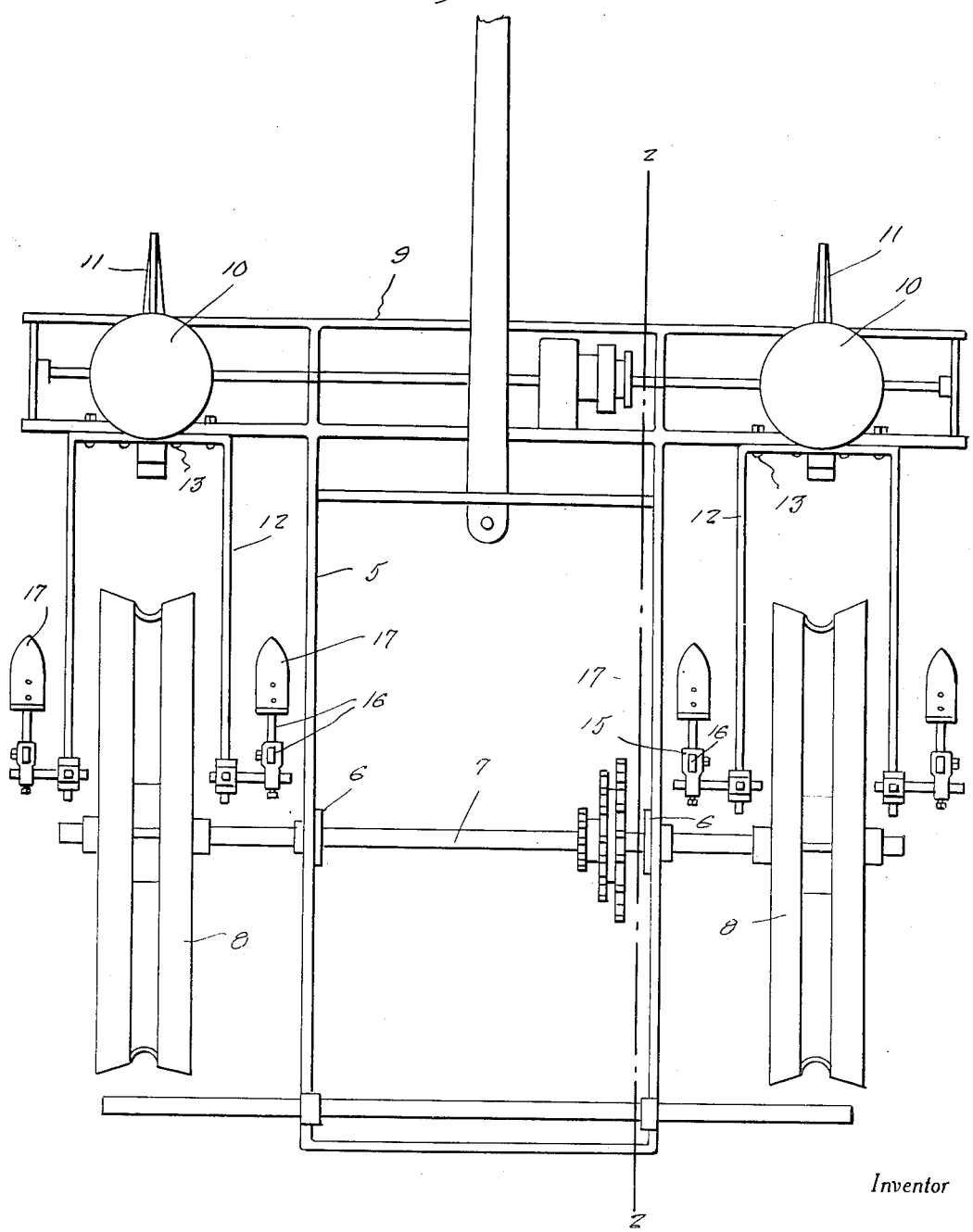

1,943,219

UNITED STATES PATENT OFFICE 1,943,219

CORN COVERER

Fred William Greimann, Sheffield, Iowa

Application February 3, 1932, Serial No. 590,697
Renewed June 16, 1933

1 Claim. (Cl. 111—52)

This invention appertains to new and useful improvements in agricultural machines, and more particularly to a novel corn covering attachment for corn planters.

The principal object of this invention is to provide a corn covering attachment for planters which can be easily installed at low cost.

Other important objects and advantages of the invention will become apparent to the reader of the following specification.

In the drawings:—

Figure 1 represents a top plan view of the planter with the attachment thereon.

Fig. 2 represents a longitudinal sectional view taken substantially on line 2—2 of Fig. 1.

Fig. 3 represents a perspective view of the attachment frame.

Referring to the drawings wherein like numerals designate like parts, it can be seen that the planter machine, which is of conventional design, includes a main frame 5 which has bearings 6—6 thereon through which the axle 7 is journalled. On this axle 7 are the planter wheels 8—8 at opposite sides of the frame 5.

At the forward end of the frame 5 is the transversely extending frame 9 which projects at its ends in front of the wheels 8 and on each end portion of the frame 5 immediately in front of a corresponding wheel 8 is the hopper and associated mechanism 10 of a planting feed dispensing mechanism, with numeral 11 representing the feed discharging shoe.

Other conventional details are disclosed in the drawings, but are not essential, and a description of the attachment will now be given.

The attachment includes an assembly on each end portion of the frame 9 and because these assemblies are identical in construction, a description of one will suffice for both. Each assembly consists of a U-shaped frame 12 secured in a horizontal rearwardly extending position, by having its bight portion attached by bolts 13 to the rear portion of the frame 9.

The leg portions of the frame 12 project rearwardly on opposite sides of the corresponding wheel 8 and adjustable on each leg portion of the frame 12 is a block 14 carrying a shovel shank clamp 15 in which the shank 16 of the corresponding shovel blade 17 is adjustable.

Thus, a shovel 17 is provided at each side of each of the wheels 8, for obviously covering the corn after it has been dropped by the feed dispensing device.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

A corn covering attachment for corn planting machines having a frame supported by wheels, comprising a U-shaped frame member adapted to be secured to the frame of the machine forwardly of the wheels thereof and its leg portions extending rearwardly and disposed upon opposite sides of the wheel, a block mounted on each leg portion of said U-shaped frame for adjustment longitudinally thereof, a clamp carried by each of said blocks, and a shovel associated with each of said clamps and having its shank mounted for vertical adjustment therein.

F. WILLIAM GREIMANN.